(12) United States Patent
Iengo et al.

(10) Patent No.: US 7,666,940 B2
(45) Date of Patent: Feb. 23, 2010

(54) AQUEOUS COMPOSITIONS CONTAINING PERFLUOROPOLYETHER DI-CARBOXYLIC SALTS FOR THE OLEO-REPELLENT PAPER TREATMENT

(75) Inventors: Paolo Iengo, Milan (IT); Mahesh Padigala, New Castle, DE (US); Piero Gavezotti, Milan (IT)

(73) Assignee: Solvay Solexis S.p.A., Milan (IT)

( * ) Notice: Subject to any disclaimer, the term of this patent is extended or adjusted under 35 U.S.C. 154(b) by 387 days.

(21) Appl. No.: 11/351,255

(22) Filed: Feb. 10, 2006

(65) Prior Publication Data

US 2007/0221348 A1  Sep. 27, 2007

(30) Foreign Application Priority Data

Feb. 10, 2005  (IT) .......................... MI2005A0188

(51) Int. Cl.
| | |
|---|---|
| C07C 19/08 | (2006.01) |
| C07C 211/02 | (2006.01) |
| C08G 63/02 | (2006.01) |
| C08J 3/03 | (2006.01) |
| C08K 3/22 | (2006.01) |
| C08K 3/34 | (2006.01) |
| C08K 5/09 | (2006.01) |
| C08K 5/17 | (2006.01) |
| C08L 79/02 | (2006.01) |
| D21H 17/33 | (2006.01) |
| D21H 17/41 | (2006.01) |
| D21H 17/42 | (2006.01) |
| D21H 17/43 | (2006.01) |
| D21H 17/44 | (2006.01) |
| D21H 17/45 | (2006.01) |

(52) U.S. Cl. .......................... 524/500; 162/158; 524/35; 524/47; 524/368; 524/377; 524/425; 524/447; 524/451; 524/462; 524/492; 524/497; 524/800

(58) Field of Classification Search ................ 162/135, 162/158, 175, 181.1, 164.6, 125, 127, 164.1, 162/164.3, 166, 178, 179; 252/8.62; 526/428, 526/247, 587, 840; 528/328, 224, 342, 448, 528/677; 8/532; 156/60, 209; 428/421; 508/250; 524/548, 612, 800, 802, 500; 525/217, 525/240, 420, 426, 435, 540, 359.5, 387; 562/840; 568/448, 677
See application file for complete search history.

(56) References Cited

U.S. PATENT DOCUMENTS

| | | | | | |
|---|---|---|---|---|---|
| 5,783,041 | A | * | 7/1998 | Underwood | ............. 162/164.1 |
| 6,323,306 | B1 | * | 11/2001 | Song et al. | ................... 528/342 |
| 6,436,235 | B1 | | 8/2002 | Haniff et al. | |
| 6,486,245 | B1 | * | 11/2002 | Thunemann et al. | ........ 524/130 |
| 6,749,641 | B2 | * | 6/2004 | Cates et al. | ................ 8/115.51 |
| 6,936,075 | B2 | * | 8/2005 | Vogt et al. | ................. 8/115.51 |
| 2003/0077963 | A1 | * | 4/2003 | Cates et al. | .................. 442/118 |
| 2003/0139521 | A1 | * | 7/2003 | Linert et al. | ................ 524/507 |
| 2003/0181572 | A1 | * | 9/2003 | Tan et al. | ..................... 524/502 |
| 2003/0224680 | A1 | * | 12/2003 | Cates et al. | ..................... 442/79 |
| 2004/0016528 | A1 | * | 1/2004 | Varnell | ..................... 162/164.6 |
| 2005/0000668 | A1 | * | 1/2005 | Iengo et al. | ............. 162/164.1 |
| 2005/0235436 | A1 | * | 10/2005 | Vogt et al. | ..................... 8/532 |
| 2006/0042767 | A1 | * | 3/2006 | Bhat et al. | .................. 162/117 |
| 2007/0106092 | A1 | * | 5/2007 | Picozzi et al. | ............... 562/587 |
| 2007/0112156 | A1 | * | 5/2007 | Guarda et al. | ............... 526/247 |

FOREIGN PATENT DOCUMENTS

| | | | |
|---|---|---|---|
| EP | 1 273 704 | A1 | 1/2003 |
| EP | 1 327 649 | A2 | 7/2003 |
| EP | 1 371 676 | A1 | 12/2003 |
| EP | 1 484 445 | A1 | 12/2004 |
| EP | 1 489 124 | A1 | 12/2004 |

OTHER PUBLICATIONS

Ono, Hiroshi and Yulin Deng. (1997) Journal of Colloid and Interface Science, 188 (1), pp. 183-192 (Available Online at: www.sciencedirect.com/science?_ob=ArticleURL&_udi=B6WHR-45N4WHN-R&_user=2502287&_rdoc=1&_fmt=&_orig=search&_sort=d&view=c&_acct=C000055109&_version=1&_urlVersion=0&_userid=2502287&md5=d1c77fdd0c35d076b075bdeee4d78f6e).*
Poly(diallyldimethylammonium chloride). (2007) Polysciences, Inc Catalog (Available Online at: www.polysciences.com/Catalog/Department/Product/98/categoryId_283/page_1/sortMethod_Name/productId_868/).*
Chad R.M. et al.; "The Sizing of Paper"; $2^{nd}$ Ed.; Tappi Press; pp. 87-101; 1989; Reynolds Ed.
Fielding H.C.; "Organofluorine Surfactants and Textile Chemicals"; pp. 215; 231-234; Banks R.E., Ed. 1979.
Howells R.D.; "Sizing with Fluorochemicals"; Tappi Sizing Short Course; pp. 1-13; Apr. 14-16, 1997; Atlanta.
Deisenroth. E. et al.; "The Designing of a new grease repellent fluorochemical for the paper industry"; Surface Coatings International; (9); pp. 440-447; 1998.

* cited by examiner

*Primary Examiner*—Vasu Jagannathan
*Assistant Examiner*—Darcy D LaClair
(74) *Attorney, Agent, or Firm*—Arent Fox LLP

(57) ABSTRACT

Aqueous dispersions comprising a mixture of:
A) from 0.05% by weight to 10% by weight of salts of perfluoropolyether di-carboxylic derivatives having formula:

$$T-O-R_f-T \quad \quad (IA)$$

wherein
T=—$CF_2$—COOZ or —$CF_2CF_2$—COOZ wherein Z=Na, K, $NH_4$, $R_1(R_2)(R_3)N$ wherein $R_1$=$R_2$=alkyl or hydroxyalkyl, $R_3$=H, alkyl or hydroxyalkyl,
$R_f$ is a (per)fluoropolyoxyalkylene chain having number average molecular weight between 500 and 10,000.
B) from 0.01% to 5% by weight of water-dispersible or water-soluble cationic polymers, having a charge density, defined as number of equivalents per weight unit of dry polymer, higher than 1 meq/g of dry polymer.

26 Claims, No Drawings

AQUEOUS COMPOSITIONS CONTAINING PERFLUOROPOLYETHER DI-CARBOXYLIC SALTS FOR THE OLEO-REPELLENT PAPER TREATMENT

The present invention relates to (per)fluoropolyethers (PFPE) bifunctional carboxylic derivatives aqueous dispersions comprising high charge density cationic polymers, and their use for oleo-repellent treatment of paper, cardboard and cellulose materials.

Specifically the invention relates to dispersions capable to confer to paper improved oleo-repellence towards compounds having a high fats and/or free fatty acids content, in particular higher than 14% by weight, preferably higher than or equal to 15%, more preferably higher than or equal to 19%, still more preferably higher than or equal to 27%.

The use of fluorinated products for the oleo-repellent treatment of paper is well known in the prior art. These compounds are used for the manufacture of paper suitable to be used with fat foods for short periods (tubs or bags for hamburger, fast food products, pop-corn, small cardboard tubs for chips, etc.) and for longer periods (flexible packages for fat foods, food for dogs and cats, biscuits, etc.)

It is well known, for example, to treat paper to confer oleo-repellence by using perfluoroalkyl derivatives, in the form of acrylic copolymers, of cationic nature (Chad R. M. et al., "The Sizing of Paper", 2nd edition, TAPPI PRESS, pages 87-90, (1989), Reynolds Ed.) or by using phosphates having perfluoroalkyl segments ("Organofluorine Chemicals and Industrial Applications"), pages 231-232, Bank R. E., Edition 1979) or by using perfluoroalkylphosphates or carboxylates having thioether structures (Howells R. D., "Sizing with Fluoro-chemicals", TAPPI Sizing Short Course, Apr. 14-16, 1997, Atlanta).

It is also known to treat paper to confer oleo-repellence by using aminoacid derivatives having. perfluoroalkyl segments (Deisenroth, E. et al., The Designing of a new grease repellent fluorochemical for the paper industry, Surface Coating International, (9), page 440, 1998)) or with N-substituted perfluoroalkylated pyrrolydines (see for example U.S. Pat. No. 6,436,235) of anionic nature.

It is also known to confer oleo-repellence to paper by treatment with perfluoropolyether derivatives having a polyurethane structure (see for example EP 1,273,704) or with perfluoropolyethers having phosphate groups (see for example EP 1,327,649, EP 1,371,676) or with perfluoropolyethers having carboxyl groups (see for example EP 1,484, 445). These fluorinated compounds are used in the manufacture process of the paper generally in two ways: in size-press treatments and in wet-end treatments.

In the size-press treatment the fluorinated compound is used, in the form of a diluted solution, to impregnate preformed paper sheets by using suitable continuous equipments (rolls) in line with the machine producing the paper.

In the wet-end treatment, the fluorinated compound in solution is added to the cellulose slurry before the formation of the paper. In case of anionic fluorinated compounds, said slurry is added, before or after the addition of the fluorinated compound, with cationic retentive agents to favor the quantitative retention of the fluorinated additive.

The cost of the fluorinated material, conferring the oleo-repellence, represents a high fraction of the final cost of the paper. Said fluorinated compounds indeed, although they are present in the final paper in amounts ranging from 0.1 to 1% by weight with respect to the dry fiber of the produced paper, represent from 10% up to 50% of the total costs (including the process water, the energy and the cellulose).

Therefore the manufacturers try to decrease the content of the fluorinated compound (dry product) but maintaining the same oleo-repellent performance. However, even when virgin cellulose is used in wet-end or in size-press, the amount of fluorinated compounds required to confer a certain level of oleo-repellence is still very high. Needless to say that virgin cellulose represents the material requiring the lowest amount of fluorinated compound to reach a certain level of oleo-repellence.

The production of flexible packages for the pet-food, i.e. food for dogs or cats under the form of crisps of various sizes and having a various content of fats, typically ranging from 8 to 27% by weight, is one of the applications requiring improved performances of resistance to oils and fats.

For these applications, it is sometimes difficult to reach the desired oleo-repellent performance at an acceptable cost. In fact packaging for some kinds of pet-food (for dogs and cats) require high amounts of fluorinated compound to protect the paper. This is due to a very high content in fats, about 27%, and a high content in free fat acids, up to 30% of the total fats.

From the above the need was felt to have available compounds for the oleo-repellent treatment of paper capable to confer, also at low dosages, improved fat-resistance performances, in particular when the amounts of fats are higher than 14% by weight, preferably higher than or equal to 15%, more preferably higher than or equal to 19%, still more preferably higher than or equal to 27%.

The Applicant has surprisingly and unexpectedly found that it is possible to solve the above technical problem by using specific compositions, as indicated herein below.

An object of the present invention is therefore stable aqueous dispersions comprising (in % by weight):

A) from 0.05% to 10%, preferably from 0.1% to 2%, of salts of perfluoropolyether di-carboxylic derivatives having the formula:

$$T-O-R_f-T \qquad (IA)$$

wherein
T=—CF$_2$—COOZ or —CF$_2$CF$_2$—COOZ wherein Z=Na, K, NH$_4$, R$_1$(R$_2$)(R$_3$)N wherein R$_1$=R$_2$=alkyl or hydroxyalkyl, R$_3$=H, alkyl or hydroxyalkyl, R$_f$ is a (per)fluoropolyoxyalkylene chain having number average molecular weight between 500 and 10,000.

B) from 0.01% to 5%, preferably from 0.05% to 1% of water-dispersible or water-soluble cationic polymers, having a charge density, defined as number of equivalents per weight unit of dry polymer, higher than 1 meq/g of dry polymer, preferably higher than 2 meq/g.

With water-dispersible or soluble cationic polymers it is meant that the cationic polymer is dispersed in water so as to render the aqueous composition transparent or slightly opalescent without phase separations nor precipitates. Water-soluble cationic polymers can also be used, preferably having a solubility higher than 5% by weight in water.

The cationic polymers B) have ionicity (charge) preferably due to the presence in the repeating unit of quaternary cationic groups, for example ammonium, phosphonium, arsonium, antimonium, preferably ammonium. A mixture of cationic polymers can also be used. Cationic polymers derived from repeating units wherein primary, secondary, tertiary amine groups, which are quaternized, can also be mentioned. Of course, as said above, the latter products must not lead to the dispersion precipitation.

Preferably the weight ratio between A) and B) is between 1:1 and 5:1.

Preferably $R_f$ is a (per)fluoropolyoxyalkylene chain formed of one or more repeating units, statistically distributed along the chain, having the following structure: (CFXO), ($CF_2CF_2O$), ($CF_2CF_2CF_2O$), ($CF_2CF_2CF_2CF_2O$), ($CR_4R_5CF_2CF_2O$), ($CF(CF_3)CF_2O$), ($CF_2CF(CF_3)O$), wherein X=F, $CF_3$; $R_4$ and $R_5$, equal to or different from each other, are selected from H, Cl, or perfluoroalkyl from 1 to 4 carbon atoms.

In particular, as $R_f$, the following (per)fluoropolyether structures can be mentioned:

—($CF_2CF(CF_3)O)_a(CFYO)_b$—     (A)

wherein Y is F or $CF_3$; a and b are integers such that the number average molecular weight is within the above range; a/b is between 10 and 100, b being different from 0;

or the repeating units indicated in (A) can be linked as follows:

—($CF_2CF(CF_3)O)_a(CFYO)_b$—$CF_2(R'_f)CF_2$—O—($CF_2CF(CF_3)O)_a(CFYO)_b$—

$R'_f$ is a fluoroalkylene group from 1 to 4 C atoms;

—($CF_2CF_2O)_c(CF_2O)_d(CF_2(CF_2)_zO)_h$—     (B)

wherein c, d and h are integers such that the number average molecular weight is within the above range, h can also be equal to 0; c/d is between 0.1 and 10, d being different from 0; h/(c+d) is between 0 and 0.05, (c+d) being different from 0; z is 2 or 3;

—($CF_2CF(CF_3)O)_e(CF_2CF_2O)_f(CFYO)_g$—     (C)

wherein Y is F or $CF_3$; e, f, g are integers such that the number average molecular weight is within the above range; e/(f+g) is between 0.1 and 10, (f+g) being different from 0, f/g is between 2 and 10, g being different from 0;

—($CF_2(CF_2)_zO)_s$—     (D)

wherein s is an integer such to give the above number average molecular weight, z has the already defined meaning;

—($CR_4R_5CF_2CF_2O)_{j'}$—     (E)

wherein $R_4$ and $R_5$ are equal to or different from each other and selected from H, Cl or perfluoroalkyl, for example having 1-4 C atoms, j' being an integer such that the number average molecular weight be that above indicated; said units inside the fluoropolyoxyalkylene chain can be linked with each other as follows:

—($CR_4R_5CF_2CF_2O)_{p'}$—$R'_f$—O—($CR_4R_5CF_2CF_2O)_{q'}$— wherein $R'_f$ is a fluoroalkylene group, for example from 1 to 4 C atoms; p' and q' are integers such that the number average molecular weight be that above mentioned;

—($CF(CF_3)CF_2O)_{j''}$—($R'_f$)—O—($CF(CF_3)CF_2O)_{j''}$—     (F)

j'' being an integer such to give the above number average molecular weight, $R'_f$ is a fluoroalkylene group from 1 to 4 C atoms.

The preferred compounds comprised in formula (IA) have the following formulas:

T''—O—($CF_2CF_2O)_m(CF_2O)_n$-T''     (I)

T''—O—($CF_2CF_2O)_m(CF_2O)_n$—($CF_2CF(CF_3)O)_p$-T''     (II)

T'-O—($CF_2CF_2CF_2O)_q$-T'     (III)

wherein:
T''=—$CF_2$—COOZ and T'=—$CF_2CF_2$—COOZ;

the indexes m, n, p and q are integers selected so that the number average molecular weight is between 500 and 10,000, preferably between 1,000 and 4,000, wherein the m/n and p/m ratios are between 0.5 and 5 in the structure (II) and in formula (I) m/n is between 0.1 and 10, m and n being different from 0.

The compounds A) of formula (I) are particularly preferred.

The pH of the aqueous dispersions of the present invention is generally between 6 and 10, preferably between 7 and 9.

Polymer B) is preferably selected from the group formed of:

1) linear or branched polyamines, having repeating units of formula:

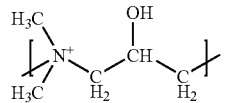

a number average molecular weight in the range 5,000-400,000, and a charge density higher than 7 meq/g.

The linear structures reported above are obtained by copolymerization of dimethylamine and epichlorohydrin, in molar ratio 1:1, by known processes of the prior art.

The corresponding branched structures are obtained with similar processes by replacing 1% to 5% by moles of dimethylamine with an aliphatic diamine, and maintaining the molar ratio between amine and epichlorohydrin equal to 1:1.

2) Polyamido-amines having repeating units of formula:

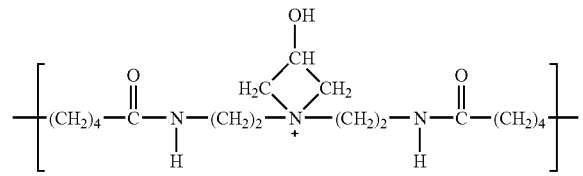

a number average molecular weight in the range 5,000-200,000 and a charge density higher than 2.5 meq/g.

3) poly diallyl dimethyl ammonium chloride (poly-DADMAC), having repeating units of structure:

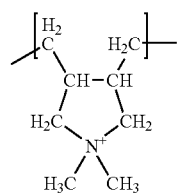

a number average molecular weight between 10,000 and 500,000 and a charge density higher than 5 meq/g.

The cationic polymers of the classes 1) and 3) are preferred, more preferably those of class 3).

The cationic polymers B) are known in the prior art and commercially available. They are very cheap compared to the fluorinated materials.

The fluorinated compounds A) are known and are marketed by the Applicant as FLUOROLINK®.

The dispersions of the present invention have a long shelf-life. They are surprisingly stable chemically and physically for at least two months, preferably for at least 6 months, more preferably for one year, and do not produce precipitation or flocculation in the temperature range from 5° to 70° C. Tests carried out by the Applicant have shown that the dispersions of the present invention are stable for at least two months at 5° C., 25° C., and 40° C. All the dispersions, showing this stability, were initially stable at the centrifugation at 3,000 rpm for 3 minutes. This fact is surprising since the interaction of an anionic fluorinated compound with a cationic polymer results in immediate precipitation with gel formation. Tests carried out by the Applicant have shown that the commercially available perfluoroalkyl derivatives of anionic nature, when mixed with cationic polymers (component B), form unstable compositions, and show an immediate precipitation or flocculation. Therefore these dispersions are unusable. This can be seen with anionic perfluoroalkyl derivatives having functional groups of carboxylic and phosphate type (see the comparative Examples).

Unexpectedly and surprisingly the aqueous dispersions of the present invention comprising specific perfluoropolyether anionic compounds A) and particular cationic polymers B) are stable, also for a long time, and do not give precipitates or gels.

The dispersions of the present invention are easily preparable—it is sufficient to mix the two components.

Furthermore the compositions of the present invention maintain unchanged their properties and characteristics for long times (high shelf-life), not showing any storage problem.

As said, an advantage of the dispersions of the present invention is that they are capable of conferring an improved oleo-repellence to paper even with the use of lower amounts of fluorinated compounds (see the comparative Examples).

The compositions of the present invention can also contain further additives, generally used in the paper production, provided that they do not substantially interfere with components A) and B) of the invention. In particular additives having a negative or positive charge are not used. It is preferable not to use hydrophilic additives. Examples of usable additives are uncharged starches, film forming agents, etc.

A further object of the present invention is the process for preparing the dispersions of the present invention comprising the steps of:

a) dispersing from 0.05 to 100, preferably from 0.1 to 2% by weight of the perfluoropolyether compound A) in water;
b) slowly adding the cationic polymer B), under stirring, to the dispersion a), up to a weight ratio between A) and B) between 1:1 and 5:1.

A further object of the present invention is the use of the aqueous dispersions of the present invention in the oleo-repellent treatment of paper in wet-end or in size-press, preferably in size-press.

As said, in the size-press treatment of the preformed paper, a composition comprising the dispersions of the present invention is applied, on both sides, by suitable continuous equipments (size-press) in line with the machine thus obtaining oleo-repellent paper. The amount of the dispersion used is such as to have a content of the fluorinated component A) between 0.1% and 1%, preferably between 0.15 and 0.5% by weight with respect to the dry cellulose weight.

In the wet-end treatment, the dispersions of the present invention are added to the cellulose slurry before the paper formation in an amount so to obtain paper having a content of the fluorinated component A) between 0.1% and 1%, preferably between 0.2% and 0.5% by weight with respect to the dry cellulose weight.

The cellulose slurry can be formed by virgin, hard wood or soft wood, obtained by kraft and/or sulphite process, suitably refined, or by recycled cellulose slurries or also by admixtures of said two kinds of slurries. The concentration of the dry cellulose in the slurry ranges from 0.1% to 10% by weight. The pulp-slurry can contain the additives normally used in the paper industry, for example organic or inorganic fillers, as talc, kaolin, calcium carbonate or titanium dioxide; coadjuvant agents as starches, dextrins, flocculating agents, buffer systems, fungicides, biocides, sequestrants, glue agents as ASA (alkenyl succinic anhydride) or AKD (alkyl ketene dimer). The cellulose suspension can have acid and basic pH, preferably basic. Chelants can also be added to the pulp-slurry to adjust the water hardness.

After the addition of the composition of the invention to the cellulose slurry, the water is removed obtaining a wet paper which is dried, for example, at temperatures in the range 90° C.-130° C., according to the standard procedures used in the paper industry.

It is therefore a further object of the present invention oleo-repellent paper obtainable by treatment in size-press or in wet-end by using the aqueous dispersions of the present invention.

The following Examples illustrate more in detail the invention without limiting the scope thereof.

EXAMPLES

Charge Density Measurements

The charge density measurement was carried out by potentiometric titration with the following method.

A sample of commercial cationic polymer having a known titre of dry product was diluted with a water/methanol 95/5 v/v mixture and titrated with a solution 0.004N of an anionic surfactant in the presence of an electrode Methrom 60507120 type for ionic surfactants.

Description of the Oleo-Repellence Tests

The oleo-repellence performances of the paper treated with the fluorinated additives are evaluated by the following tests:

Kit Test

This test is also known as TAPPI 557 method. The Kit Test requires the preparation of the following solutions:

| Solution No. | Castor oil (% volume) | Toluene (% volume) | n-heptane (% volume) | Surface tension (dynes/cm) |
|---|---|---|---|---|
| 1 | 100 | 0 | 0 | 33.9 |
| 2 | 90 | 5 | 5 | 31.2 |
| 3 | 80 | 10 | 10 | 28.8 |
| 4 | 70 | 15 | 15 | 27.6 |
| 5 | 60 | 20 | 20 | 26.3 |
| 6 | 50 | 25 | 25 | 25.3 |
| 7 | 40 | 30 | 30 | 24.8 |
| 8 | 30 | 35 | 35 | 24.4 |
| 9 | 20 | 40 | 40 | 24.1 |
| 10 | 10 | 45 | 45 | 24.0 |
| 11 | 0 | 50 | 50 | 23.8 |
| 12 | 0 | 45 | 55 | 23.4 |

A specimen of treated paper is placed on a flat and clean, black-coloured surface. One starts from the solution No. 12. A drop of the test solution is allowed to fall on the paper from a height of 25 mm. The drop is left in contact with the paper for 15 seconds, then removed by clean blotting paper and the surface under the drop examined. When the surface has become dark the specimen does not pass the test. The test is repeated with the solution No. 11. If the tested specimen does not pass the test, one continues by using the solution No. 10 and then the others in a decreasing number order, until the solution is found with which the specimen satisfies the Kit Test. The number of this solution is the Kit Test value assigned to the paper.

The Kit Test is widely used as a test for the control of the process, due to its simplicity and speed, but its results represent only a qualitative indication, as they often are insufficiently correlated to the real performance as antigrease barrier in the real application.

For said reason the following performance tests are used, which simulate more realistic use conditions as regards the fat type, the contact time and the use temperature of the antigrease paper.

RP-2 Crease Test (Ralston Crease Test)

The reactants and the instruments necessary for this test are available by Ralston Purina® Company. The Ralston Crease Test (RP-2 test) is commonly used to evaluate the resistance properties to the oil penetration in antigrease papers for petfood packaging. The specimen to be tested is conditioned for 24 h at 23° C. and 50±2% of relative humidity. A piece having 10 cm×10 cm sizes is cut out. The cutting is positioned over a flat, smooth and stiff surface, placed over a coated paper sheet on which a grid of 100 small squares is printed, having a surface exactly equal to that of the specimen to be tested. Before being positioned on the grid, the specimen is slightly creased along a diagonal. The crease is then reinforced with a suitable roll having a weight of 2040±45 g, diameter of 9.5 cm and width of 4.5 cm, covered by a rubber layer of controlled hardness having a thickness of 0.6 cm. The roll speed during the creasing must be 2-3 cm/sec. The specimen is to be creased along both diagonals, the second crease is made by creasing the paper on the opposite side. The specimen with the creases is transferred on the grid so that it perfectly covers the grid surface. A metal ring having a diameter of 7.5 cm is placed on the paper specimen to be tested. A metal pipe (height=2.5 cm, internal diameter 2.5 cm) is placed in the middle of the specimen, then 5 g of sand (Ottawa sand, 20-30 mesh) are poured into the pipe. The pipe is then removed so as to form a sand cone in the middle of the specimen. Then 1.3 cc of a specific synthetic oil supplied by Ralston Purina® which contains 0.1% by weight of a red organic dye are added to the sand cone by a syringe. In accordance with what stated by Ralston-Purina Company, this oil is a mixture of glycerol trioleate and free oleic acid and therefore it fairly well simulates the composition of a food fat.

Usually for the test at least 4 specimens of the same paper sample are prepared. The specimens with the sand are then kept in a stove at 60° C. and 50±2% of relative humidity for 24 hours.

At the end, the paper specimens with the sand are removed and the underlying grid surface stained by the coloured oil is evaluated. Each stained small square represents a fraction of the specimen surface equal to 1%. The final value is the average of the results obtained on at least 4 specimens of the same sample. The Ralston Crease Test (RP-2 test) result is then expressed as number of stained small squares, which expresses also the % of the stained squares of the grid.

The sample acceptability limit is 2% of the stained surface of the grid.

Resistance Test to Oleic Acid

The resistance test to oleic acid evaluates the capability of the paper treated with fluorinated additives to resist the hot penetration of the oleic acid. This test is very significant to check the presence of high oleo-repellence performances under realistic conditions, since the oleic acid is the most diffused fat acid, by percentage, among those constituting animal and vegetable oils. It is known that fats of vegetable or animal nature are formed of triglycerides, i.e. by glycerine esters of fat acids. It can be verified that the triglyceride penetrating power in the antigrease paper treated is lower than that shown by the single free fat acids, probably owing to the lower molecular size and to the absence of reactive free carboxylic groups.

Each fat, depending on its nature, has a particular and characteristic distribution of linear, saturated or mono-, di- or tri-unsaturated fatty acids, having an even number of carbon atoms ranging from 4 to 20. Fatty acids with an odd number of carbon atoms are present only in traces. In particular the most abundant fatty acids are those having a number of carbon atoms equal to 16 (saturated, palmitic acid) or 18 (monounsaturated, oleic acid; bi-unsaturated, linoleic acid). The oleic acid is absolutely the most abundant and is present in an amount equal to about 70% of the total fatty acids in olive oils and in amounts ranging from 40% to 50% of the total fatty acids in fats of animal origin. In fats of vegetable origin different from the olive oil, wherein the oleic acid is present in an amount ranging from 20% to 50% of the total fatty acids, most of the content in fatty acids is instead formed of the linoleic acid (18 carbon atoms, bi-unsaturated). Tests carried out by the Applicant have shown that the penetrating capability of these two acids on specimens of paper treated with different fluorinated compounds is similar.

It is then to be considered that all the fats and oils contain variable amounts, in the range 0.1-5%, of free fatty acids; furthermore, the content of free fatty acids can increase owing to triglyceride hydrolysis processes due to the conditions of their use (high temperature in cooking processes, base environments, etc).

For these reasons, if one analyzes the composition of fats and oils which commonly come into contact with the paper for fat food packaging, one can conclude that the most aggressive components, the components which first can penetrate the antigrease treated paper, are just the free fatty acids. Among these, being as said the most common, the oleic acid can be selected as representative of fatty acids capable to penetrate the antigrease-treated paper.

The oleic acid test simulates then the prolonged contact of the paper treated with fluorinated compounds with the fatty acids commonly found in food.

For carrying out the test, a treated paper specimen is taken, a square surface of about 10×10 cm is cut out and placed in a stove at 60° C. Then 20 drops of pure oleic acid, available as pure reactant of analytical degree, are placed on the specimen. The specimen with the oleic acid drops is left in the stove at 60° C. for 2 hours.

This time elapsed, the oleic acid drops are removed with blotting paper and the specimen is placed on a dark surface. The penetration of the oleic acid in the paper is shown by the darkening of the zones underlying the drops. The test is considered positive (i.e. the resistance to the oleic acid is ascertained) if no darkening in any of the examined zones occurs. The test is considered negative when darkening is occurred and therefore the tested specimen does not show resistance to the oleic acid.

Pet-Food Test

This test is particularly useful to verify the suitability of the antigrease paper for the pet-food packaging. Briefly, this test implies the contact in standardized conditions of the pet-food with the paper specimen to be tested. It is possible to use different types of pet-food, which are characterized for the different content in raw fats.

The different kinds of pet-food present on the market can be easily grouped in three different classes, characterized, respectively, by raw fat contents equal to 14%, 19% and 27% by weight.

The pet food results much more aggressive for the paper and therefore much more penetrating on oleo-repellent paper specimens, as the content of raw fats is higher.

For carrying out the test, the selected pet-food is finely milled in a mortar. An antigrease paper specimen to be tested, having 10×10 cm sizes, is cut out. This specimen is creased in a standardized way along the diagonals, likewise as made in the RP-2 test, and placed on a squared paper specimen having the same characteristics as that used in the Ralston Purina creased test. A metal ring having an internal diameter equal to 7.2 cm and height equal to 2.5 cm is placed in the middle of the specimen.

Then 60 g of milled pet-food having a determined fat content (14% or 19% or 27% by weight) are taken, and homogeneously placed inside the ring on the paper specimen to be tested. A weight equal to 1.5 kg, cylinder-shaped, having the bottom surface smooth and equal to that of the ring, is then placed on the milled pet-food present on the paper specimen. The whole is put in a stove at 60° C. and 50% relative humidity for 24 hours. This time elapsed, the weight and the pet-food are removed and the specimen surface is tested to find fat stains, which would witness the occurred fat penetration.

The test result is expressed in terms of percentage of stained surface. To have a significant result, the test is carried out on 4 specimens subjected to the same treatment and the final result is the average of the 4 tests.

The test is considered positive if the stained surface is lower than 2%.

Preparation of the Dispersions

Example 1A

Preparation of Aqueous Dispersions of Perfluoropolyether Di-Carboxylic Derivatives (IA) and Cationic Polymers of Class 1) Having High Charge Density and Chemical Structure of Polyamine Type The di-carboxylic acid of the compound of formula (I) having T=—$CF_2COOH$, and a number average molecular weight equal to 1,500 was used for the preparation of these aqueous compositions.

Following the teaching of EP 1.484.445, 200 g of said acid were added under stirring to an aqueous mixture formed of 735 g of demineralized water and 15 g of $NH_4OH$ at 30% by wt.

The mixture was reacted for 2 hours at 40° C. under stirring, then was cooled at 25° C. and 50 g of dipropylene glycol mono methyl ether were added.

The resulting dispersion was maintained under stirring for 1 hour, obtaining a solution at 20% by weight of ammonium salt of structure (I).

This dispersion was used for preparing dispersions containing cationic polymers having a high charge density. For this purpose a cationic polymer sample having structure 1) of a branched polyamine type and a number average molecular weight of 200,000, commercially available with the name of Nalkat 7607 (Nalco Corp.), was used at 50% by weight in water.

The charge density of this compound was measured by titration, and is equal to 6.3 meq/g.

The dispersions of the present invention were prepared according to the following procedure: the dispersion of the ammonium salt of the perfluoropolyether di-carboxylic acid prepared according to the previously described procedure, was diluted with water up to a desired value. The dispersion is maintained under stirring at room temperature. Then, the cationic polymer having polyamine structure was added dropwise under stirring until reaching the desired weight ratio (reported in Table 1), continuously controlling the pH to avoid that this becomes lower than 6.

The prepared dispersions were divided each in three aliquots, which were kept at 5° C., 25° C. and 40° C. for two months, to control the physical stability thereof.

Example 1B

Preparation of Aqueous Compositions of Perfluoropolyether Di-Carboxylic Derivatives (IA) and Cationic Polymers of Class 1) Having High Charge Density and Chemical Structure of Polyamine Type The above dispersions were prepared with a procedure similar to that described in the Example 1A, but by using, as component B), a linear polyamine having a number average molecular weight of about 100,000, commercially available with the name Nalkat 7655 (Nalco Corp.), at 55% by weight. The charge density of this compound was measured by titration and is equal to 5.0 mEq/g. Table 1 summarizes the characteristics of the dispersions prepared in the Examples 1A and 1B:

TABLE 1

Aqueous dispersions of ammonium salt of structure (I) and cationic polymers of the class 1) (polyamine structure)

| Ex. | Dispersion | Ammonium salt of structure (I) (% wt.) | Cationic polymer 1) (% wt.) | Type of cationic polymer | Charge density of the cationic polymer (mEq/g) |
|---|---|---|---|---|---|
| 1A | A1 | 1.0 | 0.2 | Branched polyamine (Nalkat 7607) | 6.3 |
|  | A2 | 1.0 | 0.3 | Branched polyamine (Nalkat 7607) | " |
|  | A3 | 1.0 | 0.4 | Branched polyamine (Nalkat 7607) | " |
|  | A4 | 1.0 | 0.5 | Branched polyamine (Nalkat 7607) | " |
|  | A5 | 1.0 | 0.6 | Branched polyamine (Nalkat 7607) | " |
|  | A6 | 1.0 | 0.8 | Branched polyamine (Nalkat 7607) | " |

TABLE 1-continued

Aqueous dispersions of ammonium salt of structure (I) and cationic polymers of the class 1) (polyamine structure)

| Ex. | Dispersion | Ammonium salt of structure (I) (% wt.) | Cationic polymer 1) (% wt.) | Type of cationic polymer | Charge density of the cationic polymer (mEq/g) |
|---|---|---|---|---|---|
|  | A7 | 2.0 | 0.6 | Branched polyamine (Nalkat 7607) | " |
|  | A8 | 2.0 | 1.0 | Branched polyamine (Nalkat 7607) | " |
| 1B | A9 | 1.0 | 0.3 | Linear polyamine (Nalkat 7655) | 5.0 |
|  | A10 | 1.0 | 0.4 | Linear polyamine (Nalkat 7655) | " |
|  | A11 | 1.0 | 0.6 | Linear polyamine (Nalkat 7655) | " |
|  | A12 | 1.0 | 0.8 | Linear polyamine (Nalkat 7655) | " |
|  | A13 | 1.0 | 0.4 | Linear polyamine (Nalkat 7655) | " |
|  | A14 | 2.0 | 0.5 | Linear polyamine (Nalkat 7655) | " |
|  | A15 | 2.0 | 0.6 | Linear polyamine (Nalkat 7655) | " |
|  | A16 | 2.0 | 0.8 | Linear polyamine (Nalkat 7655) | " |
|  | A17 | 2.0 | 1.0 | Linear polyamine (Nalkat 7655) | " |

The dispersions of Table 1 have a homogeneous and opalescent appearance, without precipitates.

All the prepared dispersions (samples A1-A17 in Table 1) are stable at the centrifugation at 3,000 rpm for 3 minutes, without any sedimentation. Besides, all the dispersions maintained for two months at 5°, 25° and 40° C. do not change appearance and are stable.

Example 2A

Preparation of Aqueous Compositions of Perfluoropolyether Di-Carboxylic Derivatives (IA) and Cationic Polymers of Class 3) Having High Charge Density and Chemical Structure of Poly Diallyl Dimethyl Ammonium Chloride (Poly-DADMAC) Type The dispersions here below were prepared following a procedure similar to that described in the Example 1A, but by using a commercial solution of cationic polymers having high charge density, chemical structure of Poly-DADMAC type and a number average molecular weight of 200,000, commercially available with the name of Bufloc B-535 (Buckman), at 20% by weight. The charge density of this compound was measured by titration and is equal to 5.8 mEq/g.

The characteristics of the obtained dispersions are reported in Table 2.

Example 2B

Preparation of Aqueous Compositions of Perfluoropolyether Di-Carboxylic Derivatives (IA) and Cationic Polymers of Class 3) Having High Charge Density and Chemical Structure of Poly Diallyl Dimethyl Ammonium Chloride (Poly-DADMAC) Type The above dispersions were prepared following a procedure similar to that described in the Example 1A, but by using a commercial solution of cationic polymers having high charge density, chemical structure of Poly-DADMAC type and a number average molecular weight of 200,000, commercially available with the name of Nalkat 2020 (Nalco Corp.), at 38% by weight. The charge density of this compound was measured by titration and is equal to 6.0 mEq/g. Table 2 summarizes the characteristics of the dispersions prepared in the Examples 2A and 2B.

TABLE 2

Aqueous dispersions of ammonium salt having structure (I) and cationic polymers having high charge density and a poly-DADMAC structure

| Ex. | Dispersion | Ammonium salt having structure (I) (% wt.) | Cationic polymer 4) (% wt.) | Type of cationic polymer | Charge density (mEq/g) |
|---|---|---|---|---|---|
| 2A | B1 | 1.0 | 0.3 | Poly-DADMAC (Buckman B-535) | 5.8 |
|  | B2 | 1.0 | 0.4 | Poly-DADMAC (Buckman B-535) | " |
|  | B3 | 1.0 | 0.5 | Poly-DADMAC (Buckman B-535) | " |
|  | B4 | 1.0 | 0.6 | Poly-DADMAC (Buckman B-535) | " |
|  | B5 | 1.0 | 0.8 | Poly-DADMAC (Buckman B-535) | " |
|  | B6 | 2.0 | 0.6 | Poly-DADMAC (Buckman B-535) | " |
|  | B7 | 2.0 | 0.8 | Poly-DADMAC (Buckman B-535) | " |
|  | B8 | 2.0 | 1.0 | Poly-DADMAC (Buckman B-535) | " |
|  | B9 | 3.0 | 0.9 | Poly-DADMAC (Buckman B-535) | " |
|  | B10 | 1.0 | 0.3 | Poly-DADMAC (Nalkat 2020) | 6.0 |
| 2B | B11 | 1.0 | 0.4 | Poly-DADMAC (Nalkat 2020) | " |
|  | B12 | 1.0 | 0.5 | Poly-DADMAC (Nalkat 2020) | " |

TABLE 2-continued

Aqueous dispersions of ammonium salt having structure (I) and cationic polymers having high charge density and a poly-DADMAC structure

| Ex. | Dispersion | Ammonium salt having structure (I) (% wt.) | Cationic polymer 4) (% wt.) | Type of cationic polymer | Charge density (mEq/g) |
|---|---|---|---|---|---|
| | B13 | 1.0 | 0.6 | Poly-DADMAC (Nalkat 2020) | " |
| | B14 | 2.0 | 0.6 | Poly-DADMAC (Nalkat 2020) | " |
| | B15 | 2.0 | 0.8 | Poly-DADMAC (Nalkat 2020) (Nalkat 2020) | " |
| | B16 | 2.0 | 1.0 | Poly-DADMAC (Nalkat 2020) | " |

The dispersions of Table 2 have a homogeneous and opalescent appearance, without precipitates, and show a Viscosity in the range 100-200 cPs.

All the prepared dispersions result stable at the centrifugation at 3,000 rpm for 3 minutes, without any sedimentation.

Besides, all the dispersions kept for two months at 5° C., 25° C. and 40° C. do not change appearance and are stable.

Example 3

Preparation of Aqueous Compositions of Perfluoropolyether Di-Carboxylic Derivatives (IA) and Cationic Polymers of Class 2) Having High Charge Density and Chemical Structure of Polyamido-Amine-Epichlorohydrin (PAAE) Type The above dispersions were prepared following a procedure similar to that described in the Example 1A, but by using a commercial solution of a cationic polymer having high charge density, chemical structure of polyamidoamine-epichlorohydrin (PAAE) type instead of polyamine type, and number average molecular weight of 50,000.

In particular a sample of the commercial product Cartaretin F (Clariant Corporation), at 25% by wt., was used. The charge density of this compound was measured by titration and is equal to 2.7 meq/g.

Table 3 summarizes the characteristics of the prepared dispersions.

TABLE 3

Aqueous dispersions of ammonium salt having structure (I) and cationic polymers having high charge density and polyamidoamine-epichlorohydrin (PAAE) structure

| Dispersion | Ammonium salt having structure (I) (% wt.) | Cationic polymer 2) (% wt.) | Type of cationic polymer | Charge density (mEq/g) |
|---|---|---|---|---|
| C1 | 1.0 | 0.2 | Cartaretin F (PAAE) | 2.7 |
| C2 | 1.0 | 0.4 | Cartaretin F (PAAE) | " |
| C3 | 1.0 | 0.5 | Cartaretin F (PAAE) | " |
| C4 | 1.0 | 0.6 | Cartaretin F (PAAE) | " |

TABLE 3-continued

Aqueous dispersions of ammonium salt having structure (I) and cationic polymers having high charge density and polyamidoamine-epichlorohydrin (PAAE) structure

| Dispersion | Ammonium salt having structure (I) (% wt.) | Cationic polymer 2) (% wt.) | Type of cationic polymer | Charge density (mEq/g) |
|---|---|---|---|---|
| C5 | 1.0 | 1.0 | Cartaretin F (PAAE) | " |
| C6 | 2.0 | 0.8 | Cartaretin F (PAAE) | " |
| C7 | 2.0 | 1.0 | Cartaretin F (PAAE) | " |
| C8 | 2.0 | 1.2 | Cartaretin F (PAAE) | " |
| C9 | 3.0 | 1.5 | Cartaretin F (PAAE) | " |
| C10 | 5.0 | 1.5 | Cartaretin F (PAAE) | " |

The dispersions of Table 3 have a homogeneous, transparent and colourless appearance, without precipitates and have a viscosity between 10 and 50 cPs.

All the prepared dispersions (C1-C10 in Table 3) are stable at the centrifugation at 3,000 rpm for 3 minutes, without any sedimentation.

Besides, all the dispersions kept for two months at 5° C., 25° C. and 40° C. do not change appearance and are stable.

Example 4 (Comparative)

Preparation of Aqueous Compositions Containing Perfluoroalkyl Derivatives Having Functional Groups of Carboxylic Type and Cationic Polymers Having High Charge Density The dispersions mentioned below were prepared with the same procedure described in the Examples 1A, 1B, by using, instead of the ammonium salt of structure (I), the following commercial anionic fluorinated compounds having carboxylic functional groups which are commonly used in the art for the oleo-repellent treatment of paper (Ciba Specialties):

Lodyne®P-201 formed of a carboxylated salt of a perfluoroalkyl-based compound, containing a thioether bond;

Lodyne® 2000 formed of an aqueous dispersion of an aminoacidic derivative containing perfluoroalkyl segments;

Lodyne® 2010 formed of an aqueous dispersion of a pyrrolidine derivative containing perfluoroalkyl segments.

Said anionic compounds were used at the lowest concentration indicated in the Examples 1(A,B), 2(A,B), 3 and the cationic polymer was used in the lowest weight ratio i.e. 1:5. The characteristics of the prepared dispersions are described in Table 4.

TABLE 4

Dispersions containing perfluoroalkyl derivatives having functional groups of carboxylic type and cationic polymers having high charge density

| Fluorinated compound | | Cationic polymer | | Dispersion appearance at zero time |
|---|---|---|---|---|
| Type | % by weight | Class | % by weight | |
| Lodyne® P-201 | 0.5 | 1): Nalkat 7607 3): Bufloc | 0.1 | Whitish precipitate, separable by centrifugation Whitish precipitate, |

TABLE 4-continued

Dispersions containing perfluoroalkyl derivatives having functional groups of carboxylic type and cationic polymers having high charge density

| Fluorinated compound | | Cationic polymer | | |
|---|---|---|---|---|
| Type | % by weight | Class | % by weight | Dispersion appearance at zero time |
| | | B-535 | | separable by centrifugation |
| | | 2): Cartaretin F | | Whitish precipitate, separable by centrifugation |
| Lodyne® 2000 | 0.5 | 1): Nalkat 7607 | 0.1 | Yellow precipitate, separable by centrifugation |
| | | 3): Bufloc B-535 | | Yellow precipitate, separable by centrifugation |
| | | 2): Cartaretin F | | Yellow precipitate, separable by centrifugation |
| Lodyne® 2010 | 0.5 | 1): Nalkat 7607 | 0.1 | Yellow precipitate, separable by centrifugation |
| | | 3): Bufloc B-535 | | Yellow precipitate, separable by centrifugation |
| | | 2): Cartaretin F | | Yellow precipitate, separable by centrifugation |

The Example shows that the dispersions formed of anionic perfluoroalkyl derivatives having functional groups of carboxylic type and of cationic polymers having high charge density are unstable, since there is an immediate precipitation of the fluorinated compound. These dispersions are therefore unusable for the paper treatment.

Example 5 (Comparative)

Preparation of Aqueous Compositions Containing Perfluoroalkyl Derivatives Having Functional Groups of Phosphate Type and Cationic Polymers Having High Charge Density The dispersions here below were prepared with the same procedure described in the Examples 1(A,B), 2(A,B) and 3, by using, instead of the ammonium salt of structure (I), the following commercial anionic fluorinated compounds having phosphate functional groups, used in the art for the oleo-repellent paper treatment:

Lodyne® P-208E (Ciba Specialties) formed of an ammonium salt of a phosphoric diester containing a thioether bond and two perfluoroalkyl segments;

Asahi Guard® AG530N (Asahi Glass) aqueous dispersion of diethanolamine salts of perfluoroalkylethylphosphates;

Scotchban® FC-807A (3M) formed of an aqueous dispersion of ammonium salt of bis(N-ethyl-2-perfluoroalkyl-sulphonamido ethyl)phosphate, phosphoric monoester and di-ester mixture wherein the diester is not higher than 15% by weight.

Said anionic compounds were used at the lowest concentration indicated in the Examples 1-3 and the cationic polymer was used in the lowest weight ratio i.e. 1:5.

The characteristics of the prepared dispersions are described in Table 5.

TABLE 5

Dispersions containing perfluoroalkyl derivatives having functional groups of carboxylic type and cationic polymers having high charge density

| Fluorinated compound | | Cationic polymer | | |
|---|---|---|---|---|
| Type | % by weight | Class | % by weight | Dispersion appearance at zero time |
| Lodyne® P-208E | 0.5 | 1): Nalkat 7607 | 0.1 | Yellow precipitate, separable by centrifugation |
| | | 3): Bufloc B-535 | | Yellow precipitate, separable by centrifugation |
| | | 2): Cartaretin F | | Yellow precipitate, separable by centrifugation |
| AG530N | 0.5 | 1): Nalkat 7607 | 0.1 | Whitish precipitate, separable by centrifugation |
| | | 3): Bufloc B-535 | | Whitish precipitate, separable by centrifugation |
| | | 2): Cartaretin F | | Whitish precipitate, separable by centrifugation |
| FC-807A | 0.5 | 1): Nalkat 7607 | 0.1 | Whitish precipitate, separable by centrifugation |
| | | 3): Bufloc B-535 | | Whitish precipitate, separable by centrifugation |
| | | 2): Cartaretin F | | Whitish precipitate, separable by centrifugation |

The Example shows that the dispersions formed of perfluoroalkyl derivatives having functional groups of phosphate type and cationic polymers having high charge density are unstable since there is an immediate precipitation of the fluorinated compound.

These dispersions are therefore unusable for the paper treatment.

Wet End Paper Treatment

Example 6

Production of Paper Specimens Having Oleo-Repellence Properties by Treatment in Wet-End of Virgin Fiber with the Dispersions of the Examples 1A and 1B A slurry of virgin fiber, containing 60% by weight of maple soft wood and 40% of eucalyptus hard wood, is refined at 33° SR (Shopper degrees).

A suitable amount of this slurry is then transferred into a laboratory sheetforming machine. Some of the dispersions prepared in the Examples 1A and 1B are added to the slurry previous dilution with water, so as to have a prefixed Concentration of fluorinated compound with respect to the dry fiber, expressed as percent by weight of fluorinated compound (dry) with respect to the dry fiber, as reported in Table 7. The pH of the bath is about 7.5.

In each test the wet paper specimen is recovered and dried in press at 105° C. for 2 minutes. The weight of the obtained paper specimen is equal to 70 g/m².

The oleo-repellence properties of the specimen, evaluated with the previously described tests, are reported in Table 6.

TABLE 6

Oleo-repellence properties of the paper specimens treated in wet-end with the dispersions of the present invention prepared in the Examples 1A and 1B

| Dispersion | Weight % of fluorinated compound on dry fiber | Kit Test | RP-2 creased test (% of stained surface) | Pet Food Test | Oleic acid test |
|---|---|---|---|---|---|
| A2 | 0.3 | 7 | 0 | 14% of fats passes | Positive |
|  | 0.5 | 9 | 0 | 19% of fats passes | Positive |
| A3 | 0.3 | 7 | 0 | 14% of fats passes | Positive |
|  | 0.5 | 9 | 0 | 19% of fats passes | Positive |
| A10 | 0.3 | 7 | 0 | 14% of fats passes | Positive |
|  | 0.5 | 9 | 0 | 19% of fats passes | Positive |

The data of the Table show that the dispersions of the present invention confer to the paper, by wet-end treatment, high oleo-repellence properties.

Example 7

Treatment in Wet-End of Virgin Fiber with the Dispersions Prepared in the Examples 2A and 2B For the preparation of said paper specimens, one proceeds likewise as made in the Example 6, by using some of the dispersions prepared in the Examples 2A and 2B. The obtained results are reported in Table 7.

TABLE 7

Oleo-repellence properties of the specimens of paper treated in wet-end with the dispersions of the present invention prepared in the Examples 2A e 2B

| Dispersion | % by Weight of fluorinated compound on dry fiber | Kit Test | RP-2 creased test (% of stained surface) | Pet Food Test | Oleic acid test |
|---|---|---|---|---|---|
| B2 | 0.2 | 7 | 0 | 14% of fats passes | Positive |
|  | 0.3 | 7 | 0 | 19% of fats passes | Positive |
| B3 | 0.2 | 7 | 0 | 14% of fats passes | Positive |
|  | 0.25 | 7 | 0 | 14% of fats passes | Positive |
|  | 0.3 | 8 | 0 | 19% of fats passes | Positive |
|  | 0.4 | 9 | 0 | 27% of fats passes | Positive |
| B11 | 0.2 | 7 | 0 | 14% of fats passes | Positive |

TABLE 7-continued

Oleo-repellence properties of the specimens of paper treated in wet-end with the dispersions of the present invention prepared in the Examples 2A e 2B

| Dispersion | % by Weight of fluorinated compound on dry fiber | Kit Test | RP-2 creased test (% of stained surface) | Pet Food Test | Oleic acid test |
|---|---|---|---|---|---|
|  | 0.25 | 7 | 0 | 14% of fats passes | Positive |
|  | 0.3 | 8 | 0 | 19% of fats passes | Positive |
|  | 0.4 | 9 | 0 | 27% of fats passes | Positive |

The data of the table show that the dispersions of the present invention confer to the paper, by treatment in wet-end, high oleo-repellence properties.

Example 8 (Comparative)

The preparation of the paper specimens was repeated by treatment in wet-end as in the Example 6, but by adding to the paper slurry only the ammonium salt of structure (I) prepared in the Example 1(A,B) instead of the dispersions of the present invention.

After the addition of the fluorinated compound (I), the slurry is cationized with 0.2% by weight of the retention agent of class 3) having high charge density having Poly-DAD-MAC structure, Buckman B-535, to favour the retention of the fluorinated material. The obtained results are reported in Table 8, compared with the results obtained in the Example 7, the concentration of fluorinated compound with respect to the dry cellulose being equal.

Example 9 (Comparative)

The Example 8 (comparative) was repeated except that the cationic polymer was added to the slurry before adding the fluorinated compound. The obtained results are reported in Table 8, compared with the results obtained in the Example 7, the concentration of fluorinated compound with respect to the dry cellulose being equal.

TABLE 8

Oleo-repellence of paper specimens treated in wet-end with the ammonium salt of structure (I) and of specimens treated with the dispersions of the Example 7

| Ex. | Dispersion | % by wt. of fluorinated Compound on dry fiber | Kit Test | RP-2 creased test (% of stained surface) | Pet Food Test | Oleic acid test |
|---|---|---|---|---|---|---|
| 8 (comp) | Ammonium salt (I) | 0.2 | 5 | >10 | All fail | Negative |
|  |  | 0.3 | 7 | 0 | 14% of fats passes | Positive |
|  |  | 0.5 | 9 | 0 | 14% of fats passes | Positive |
| 9 (comp) | Ammonium salt (I) | 0.2 | 5 | >10 | All fail | Negative |
|  |  | 0.3 | 7 | 0 | 14% of fats passes | Positive |
|  |  | 0.5 | 9 | 0 | 14% of fats passes | Positive |
| 7 | B2 | 0.2 | 7 | 0 | 14% of fats passes | Positive |
|  |  | 0.3 | 7 | 0 | 19% of fats passes | Positive |
|  | B3 | 0.2 | 7 | 0 | 14% of fats passes | Positive |
|  |  | 0.3 | 8 | 0 | 19% of fats passes | Positive |

The results reported in the Table show that the dispersions of the present invention formed of the fluorinated compound (I) and of the cationic polymers having high charge density are capable to give performances globally higher than those obtainable only with fluorinated compound, the concentration of fluorinated compound being equal.

Furthermore from Table 8 it results that, the oleo-repellent performances being equal, the dispersions of the present invention allow to use a lower amount of fluorinated anionic compound with respect to the dry fiber and therefore there is a lower cost of the obtained paper.

Example 10 (Comparative)

The preparation procedure described in the Example 9 (comparative) was repeated, by adding to the slurry the following commercial anionic oleo-repellent products defined in the Examples 4 and 5 in amounts equal to 0.2% of product (dry) with respect to the dry fiber, instead of the dispersions of the present invention: Lodyne® P-208E (Ciba Specialties); Lodyne® 2000 (Ciba Specialties); Lodyne® 2010 (Ciba Specialties); Scotchban® FC-807A (3M); Asahi Guard® AG530N (Asahi Glass).

The oleo-repellent properties of the prepared specimens are reported in Table 9 in comparison with those obtained by using some dispersions of the Example 2A in accordance with the present invention, the concentration of fluorinated compound with respect to the dry fiber and the cationic polymer being equal.

TABLE 9

Comparison of the oleo-repellence performances of paper samples obtained by treatment in wet-end

| Dispersion | % by weight of fluorinated compound on dry fiber | Kit Test | RP-2 creased test (% of stained surface) | Pet Food Test | Oleic acid test |
|---|---|---|---|---|---|
| B2 | 0.2 | 7 | 0 | 14% of fats passes | Positive |
| B3 | 0.2 | 7 | 0 | 14% of fats passes | Positive |
| Lodyne ® P-208E | 0.2 | 7 | 0 | All fail | Negative |
| Lodyne ® 2000 | 0.2 | 5 | >5 | All fail | Negative |
| Lodyne ® 2010 | 0.2 | 5 | 0 | All fail | Negative |
| FC-807A | 0.2 | 6 | >10 | All fail | Negative |
| AG530N | 0.2 | 6 | >10 | All fail | Negative |

Size-Press Paper Treatment

Example 11

Production of Paper Specimens Having Oleo-Repellence Properties by Size-Press Treatment by Using the Dispersions of the Examples 1A and 1B A4 format paper sheets formed of a bleached virgin cellulose mixture, not containing mineral fillers or glue agents, with a weight equal to 65 g/m² and a porosity according to Gurley equal to 40 s/ml, were treated by a laboratory size-press equipment with the aqueous dispersions of the Examples 1A and 1B, suitably diluted with water to have the percentages by weight of the fluorinated compound with respect to the dry product reported in Table 10.

The wet sheets were dried in press at 105° C. for 2 minutes. The oleo-repellence properties of the obtained specimens are reported in the following Table 10.

TABLE 10

Oleo-repellence properties of the paper specimens treated in size-press with the dispersions of the Examples 1A and 1B

| Dispersion | % by weight of fluorinated compound on dry fiber | Kit Test | RP-2 creased test (% of stained surface) | Pet Food Test | Oleic acid test |
|---|---|---|---|---|---|
| A3 | 0.2 | 8 | 0 | 14% of fats passes | Positive |
|  | 0.3 | 9 | 0 | 19% of fats passes | Positive |
| A5 | 0.2 | 8 | 0 | 14% of fats passes | Positive |
|  | 0.3 | 9 | 0 | 19% of fats passes | Positive |
| A13 | 0.2 | 8 | 0 | 14% of fats passes | Positive |
|  | 0.3 | 9 | 0 | 14% of fats passes | Positive |

The data of the Table show that the dispersions of the present invention (Examples 1A, 1B) confer to the paper high oleo-repellence properties even by surface size-press treatment.

Example 12

Size-Press Treatment of Paper Specimens Using the Compositions of the Examples 2A and 2B Following the procedure of the Example 11, specimens of paper were treated by using the dispersions prepared in the Examples 2A and 2B suitably diluted with water to have the percentages by weight of the fluorinated compound with respect to the dry fiber reported in Table 11. The obtained oleo-repellence results are reported in the following Table 11.

TABLE 11

Oleo-repellence properties of the specimens of paper treated in size-press with the dispersions of the Examples 2A and 2B

| Dispersion | % by weight of fluorinated compound on dry fiber | Kit Test | RP-2 creased test (% of stained surface) | Pet Food Test | Oleic acid test |
|---|---|---|---|---|---|
| B2 | 0.15 | 6 | 0 | 19% of fats passes | Positive |
|  | 0.25 | 8 | 0 | 27% of fats passes | Positive |
| B3 | 0.15 | 7 | 0 | 27% of fats passes | Positive |
|  | 0.25 | 9 | 0 | 27% | Positive |

TABLE 11-continued

Oleo-repellence properties of the specimens of paper treated in size-press with the dispersions of the Examples 2A and 2B

| Dispersion | % by weight of fluorinated compound on dry fiber | Kit Test | RP-2 creased test (% of stained surface) | Pet Food Test | Oleic acid test |
|---|---|---|---|---|---|
| B4 | 0.15 | 7 | 0 | 27% of fats passes | Positive |
|  | 0.25 | 9 | 0 | 27% of fats passes | Positive |
| B12 | 0.15 | 7 | 0 | 27% of fats passes | Positive |
|  | 0.25 | 9 | 0 | 27% of fats passes | Positive |

The data of the Table show that the dispersions of the present invention (Examples 2A, 2B) confer to the paper high oleo-repellence properties even by surface size-press treatment.

Example 13

Size-Press Treatment of Paper Specimens by Using the Compositions of the Example 3

For the preparation of said specimens of paper, one proceeds as described in the Example 11, but by using the dispersions prepared in the Example 3 suitably diluted with water to have the percentages by weight of the fluorinated compound with respect to the dry fiber as reported in the following Table 12. The obtained oleo-repellence results are reported in Table 12.

TABLE 12

Oleo-repellence properties of the specimens of paper treated in size-press with the dispersions of the Example 3

| Dispersion | % by weight of fluorinated compound on dry fiber | Kit Test | RP-2 creased test (% of stained surface) | Pet Food Test | Oleic acid test |
|---|---|---|---|---|---|
| C3 | 0.2 | 7 | 0 | 14% of fats passes | Positive |
|  | 0.3 | 9 | 0 | 14% of fats passes | Positive |
| C4 | 0.3 | 9 | 0 | 14% of fats passes | Positive |
|  | 0.4 | 9 | 0 | 19% of fats passes | Positive |

The Example shows that the dispersions of the present invention confer to the paper high oleo-repellence properties also by surface size-press treatment.

Example 14 (Comparative)

The Example 11 was repeated but by using only the ammonium salt (I) of the Example 1, without formulating it with any cationic polymer. The obtained results are reported in the following Table 13, compared with those obtained by using some of the dispersions of the Examples 11-13.

TABLE 13

| Dispersion | % by weight of fluorinated compound on dry fiber | Kit Test | RP-2 creased test (% of stained surface) | Pet Food Test | Oleic acid test |
|---|---|---|---|---|---|
| Ammonium salt (I) (comp.) | 0.2 | 5 | >10 | All fail | Negative |
| A3 (ex. 11) | 0.2 | 8 | 0 | 14% of fats passes | Positive |
| B2 (ex. 12) | 0.15 | 6 | 0 | 19% of fats passes | Positive |
| C3 (ex. 13) | 0.2 | 7 | 0 | 14% of fats passes | Positive |

The results reported in the Table show that the dispersions of the present invention comprising the fluorinated compound (I) and particular cationic polymers are capable to give performances globally higher than those obtainable only with the fluorinated compound (I).

Example 15 (Comparative)

The Example 11 was repeated but by using, instead of the dispersions of the present invention, the commercial fluorinated compounds defined in the Examples 4 and 5: Lodyne® P-208E (Ciba Specialties); Lodyne® 2000 (Ciba Specialties); Lodyne® 2010 (Ciba Specialties); Scotchban® FC-807A (3M); Asahi Guard® AG530N (Asahi Glass).

The oleo-repellent properties of the treated specimens are reported in Table 14 in comparison with those obtained in the comparative Examples 11-12.

TABLE 14

| Dispersion | % by weight of fluorinated compound on dry fiber | Kit Test | RP-2 creased test (% of stained surface) | Pet Food Test | Oleic acid test |
|---|---|---|---|---|---|
| A3 (ex. 11) | 0.2 | 8 | 0 | 14% of fats passes | Positive |
| B3 (ex. 12) | 0.15 | 7 | 0 | 27% of fats passes | Positive |
| Lodyne ® P-208E | 0.2 | 8 | 0 | All fail | Negative |
| Lodyne ® 2000 | 0.2 | 8 | 0 | All fail | Negative |
| Lodyne ® 2010 | 0.2 | 8 | 0 | 14% of fats passes | Negative |
| FC-807A | 0.2 | 8 | >5 | All fail | Negative |
| AG530N | 0.2 | 8 | >20 | All fail | Negative |

Example 16

Size-Press Treatment by Using the Compositions of the Examples 1A, 2A and 2B After Storage for 2 Months at 25° C.

For the preparation of said specimens of paper, one proceeds as described in the Example 11, but by using the prepared dispersions of the Examples 1A and 2A after storage for 2 months at 25° C. in closed vessels. The obtained results are reported in Table 15, compared with the results obtained in the Examples 11 and 12 by using the same dispersions immediately after their preparation.

TABLE 15

| Ex. | Dispersion | % by weight of fluorinated compound on dry fiber | Kit Test | RP-2 creased test (% of stained surface) | Pet Food Test | Oleic acid test |
|---|---|---|---|---|---|---|
| 11 | A3 | 0.2 | 8 | 0 | 14% of fats passes | Positive |
|  |  | 0.3 | 9 | 0 | 19% of fats passes | Positive |
| 12 | B3 | 0.15 | 7 | 0 | 27% of fats passes | Positive |
|  |  | 0.25 | 9 | 0 | 27% of fats passes | Positive |
| 16 | A3 | 0.2 | 8 | 0 | 14% of fats passes | Positive |
|  |  | 0.3 | 9 | 0 | 19% of fats passes | Positive |
|  | B3 | 0.15 | 7 | 0 | 27% of fats passes | Positive |
|  |  | 0.25 | 9 | 0 | 27% of fats passes | Positive |

The obtained results are quite similar to those obtained in the Examples 11 and 12, showing that the compositions of the present invention maintain unaltered their performances even after storage for 2 months at 25° C.

Example 17 (Comparative)

Size-Press Treatment with Aqueous Compositions of Perfluoropolyether Di-Carboxylic Derivatives (IA) and Cationic Polymers Having Low Charge Density The Examples 11 and 12 were repeated but by using dispersions E2, E3 containing the same fluorinated compound (I) used in the Examples 1(A,B) and 2(A,B) and a cationic starch having a charge density equal to 0.2 mEq/g (Cato 235, National Starch) whose cationicity is due to the quaternary ammonium.

The compositions E2, E3 are defined as follows:

E2=1% fluorinated compound+0.4% of cationic polymer having low charge density;

E3=1% fluorinated compound+0.5% of cationic polymer having low charge density.

The properties obtained by using E2, E3 are reported in Table 16, in comparison with those of the dispersions A3, B3 of the present invention, the concentration of cationic polymer and of fluorinated product in the dispersion being equal.

TABLE 16

| Ex. | Dispersion | % by weight of fluorinated compound on dry fiber | Kit Test | RP-2 creased test (% of stained surface) | Pet Food Test | Oleic acid test |
|---|---|---|---|---|---|---|
| 11 | A3 | 0.2 | 8 | 0 | 14% of fats passes | Positive |
|  |  | 0.3 | 9 | 0 | 19% of fats passes | Positive |
| 12 | B3 | 0.15 | 7 | 0 | 27% of fats passes | Positive |
|  |  | 0.25 | 9 | 0 | 27% of fats passes | Positive |
| 17 (comp) | E2 | 0.2 | 7 | >10 | Negative | Negative |
|  |  | 0.3 | 8 | >5 | Negative | Negative |
|  | E3 | 0.2 | 7 | >10 | Negative | Negative |
|  |  | 0.3 | 8 | >5 | Negative | Negative |

The obtained results show that the dispersions formed of fluorinated compounds (IA) and of cationic polymers having low charge density have poor oleo-repellence properties in comparison with those of the dispersions of the present invention, the fluorinated product with respect to the dry fiber being equal.

The invention claimed is:

1. Aqueous dispersions consisting essentially of a mixture of:
    A) salts of perfluoropolyether di-carboxylic derivatives, having formula:

$$T-O-R_f-T \quad (IA)$$

wherein
        $T=-CF_2-COOZ$ or $-CF_2CF_2-COOZ$ wherein $Z=Na$, K, $NH_4$, or $R_1(R_2)(R_3)N$ wherein $R_1=R_2=$alkyl or hydroxyalkyl, $R_3=H$, alkyl or hydroxyalkyl,
        $R_f$ is a (per)fluoropolyoxyalkylene chain having number average molecular weight between 500 and 10,000,
    wherein the salts are in an amount from 0.05% to 10% by weight of the aqueous dispersions; and
    B) water-dispersible or water-soluble cationic polymers, having a charge density, defined as number of equivalents per weight unit of dry polymer, higher than 1 meq/g of dry polymer, in an amount from 0.01% to 5% by weight of the aqueous dispersions; and
    wherein A) and B) are chemically and physically stable in the aqueous dispersions for at least two months at temperatures between 5° C. and 40° C.

2. The aqueous dispersions according to claim 1, wherein the weight ratio between A) and B) is between 1:1 and 5:1.

3. The aqueous dispersions according to claim 1, wherein $R_f$ is a (per)fluoropolyoxyalkylene chain formed of one or more repeating units, statistically distributed along the chain, having the following structure:
    $(CFXO)$, $(CF_2CF_2O)$, $(CF_2CF_2CF_2O)$, $(CF_2CF_2CF_2CF_2O)$, $(CR_4R_5CF_2CF_2O)$, $(CF(CF_3)CF_2O)$, or $(CF_2CF(CF_3)O)$,
    wherein X=F, $CF_3$; $R_4$ and $R_5$, equal to or different from each other, are selected from the group consisting of H, Cl, or perfluoroalkyl from 1 to 4 carbon atoms.

4. The aqueous dispersions according to claim 1, wherein $R_f$ is selected from the following (per)fluoropolyether structures:

$$-(CF_2CF(CF_3)O)_a(CFYO)_b- \quad (A)$$

wherein Y is F or $CF_3$; a and b are integers such that the number average molecular weight is within the above range; a/b is between 10 and 100, b being different from 0; or the repeating units indicated in (A) can be linked as follows:
    $-(CF_2CF(CF_3)O)_a(CFYO)_b-CF_2(R'_f)CF_2-O-(CF_2CF(CF_3)O)_a(CFYO)_b-R'_f$ is a fluoroalkylene group from 1 to 4 C atoms;

$$-(CF_2CF_2O)_c(CF_2O)_d(CF_2(CF_2)_zO)_h- \quad (B)$$

wherein c, d and h are integers such that the number average molecular weight is within the above range, h can also be equal to 0; c/d is between 0.1 and 10, d being different from 0; h/(c+d) is between 0 and 0.05, (c+d) being different from 0; z is 2 or 3;

$$-(CF_2CF(CF_3)O)_e(CF_2CF_2O)_f(CFYO)_g- \quad (C)$$

wherein Y is F or $CF_3$; e, f, g are integers such that the number average molecular weight is within the above range; e/(f+g) is between 0.1 and 10, (f+g) being different from 0; f/g is between 2 and 10, g being different from 0;

$$-(CF_2(CF_2)_zO)_s- \quad (D)$$

wherein s is an integer such that the number average molecular weight is as defined above, and z has the already defined meaning;

$$-(CR_4R_5CF_2CF_2O)_{j'}- \quad (E)$$

wherein $R_4$ and $R_5$ are equal to or different from each other and selected from the group consisting of: H, Cl or perfluoroalkyl, j' is an integer such that the number average molecular weight is as defined above; wherein the repeating units indicated in (E) can be linked with each other as follows:

$$-(CR_4R_5CF_2CF_2O)_{p'}-R'_f-O-(CR_4R_5CF_2CF_2O)_{q'}-$$

wherein R'$_f$ is a fluoroalkylene group, p' and q' are integers such that the number average molecular weight is as defined above; and

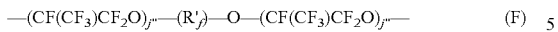   (F)

wherein j" being an integer such to give the above number average molecular weight, is as defined above, and R'$_f$ is a fluoroalkylene group from 1 to 4 C atoms.

5. The aqueous dispersions according to claim 4, wherein in polymer E), R$_4$ and R$_5$ are equal or different from each other and are selected from the group consisting of: H, Cl, and a perfluoroalkyl having 1 to 4 C atoms.

6. The aqueous dispersions according to claim 4, wherein in polymer E), R'$_f$ is a fluoroalkylene having 1 to 4 C atoms.

7. The aqueous dispersions according to claim 1, wherein the compounds of formula (IA) have the following formulas:

   (I)

   (II)

   (III)

wherein:

T"=—CF$_2$—COOZ and T'=—CF$_2$CF$_2$—COOZ;

m, n, p and q indexes are integers selected so that the number average molecular weight is between 500 and 10,000, wherein the m/n and p/m ratios are between 0.5 and 5 in the structure (II) and in formula (I), the m/n is between 0.1 and 10, m and n are not 0.

8. The aqueous dispersions according to claim 7, wherein the compounds A) have formula (I).

9. The aqueous dispersions according to claim 7, wherein m, n, p, and q are integers selected so that the number average molecular weight is between 1000 and 4,000.

10. The aqueous dispersions according to claim 1, wherein polymer B) is selected from the group consisting of:

1) linear or branched polyamines having repeating units of formula:

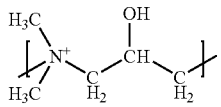

having a number average molecular weight between 5,000 and 400,000, and a charge density higher than 7 meq/g;

2) polyamido-amines having repeating units of formula:

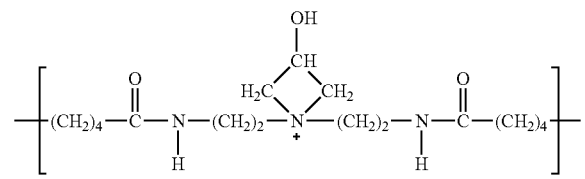

having a number average molecular weight in the range of 5,000-200,000 and a charge density higher than 2.5 meq/g; and 3) poly diallyl dimethyl ammonium chloride (poly-DAD-MAC), having repeating units of structure:

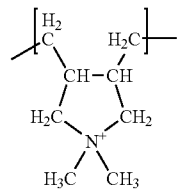

having a number average molecular weight in the range of 10,000-500,000 and a charge density higher than 5 meq/g.

11. The aqueous dispersions according to claim 10, wherein the cationic polymer of component B) is selected from the classes 1) and 3).

12. The aqueous dispersions according to claim 11, wherein the cationic polymer of component B) is selected from class 3).

13. The aqueous dispersions according to claim 1, comprising additives used in the paper production which do not substantially interfere with components A) and B).

14. The aqueous dispersions according to claim 13, wherein the additives are selected from uncharged starches and film forming agents.

15. A process for preparing the aqueous dispersions according to claim 1, comprising the steps of:
 a) dispersing from 0.05% to 10% by weight of component A) in water;
 b) slowly adding the cationic polymer B), under stirring, to the dispersion a), until reaching a weight ratio between A) and B) comprised between 1:1 and 5:1.

16. The process according to claim 10, comprising the step of: a) dispersing from 0.1% to 2% by weight of component A) in water.

17. A method of treating paper in wet-end or size press, comprising using the aqueous dispersions according to claim 1.

18. The method according to claim 17, comprising conferring to paper oleorepellence to compounds having a high fat and/or free fatty acid content higher than 14% by weight.

19. Compositions for the oleo-repellent treatment of paper in size press comprising the aqueous dispersions of claim 1 and suitable additives used in the paper industry.

20. Compositions for the treatment in wet-end comprising the aqueous dispersions of claim 1, a cellulose slurry, and suitable additives selected from the group consisting of: organic or inorganic fillers, coadjuvant agents, flocculating agents, buffer systems, fungicides, biocides, sequestrants, glue agents, and chelants.

21. The compositions according to claim 20, comprising additives selected from the group consisting of: talc, kaolin, calcium carbonate, titanium dioxide, starches, dextrins, ASA (alkenyl succinic anydride), and AKD (alkyl ketene dimer).

22. Oleo-repellent paper obtainable by treatment in size-press or in wet-end by using the aqueous dispersions according to claim 1.

23. The aqueous dispersions according to claim 1, comprising from 0.1% to 2% by weight of salt of perfluoropolyether di-carboxylic derivatives having formula (IA).

24. The aqueous dispersions according to claim 1, comprising 0.05% to 1% by weight of said water-dispersible or water-soluble cationic polymers.

25. The aqueous dispersions according to claim 1 wherein the water-dispersible or water-soluble cationic polymers have a charge density, defined as number of equivalents per weight unit of dry polymer higher than 2 meq/g of dry polymer.

26. The aqueous dispersions according to claim 1, wherein the aqueous dispersions are chemically and physically stable for at least 1 year.

* * * * *